(12) United States Patent
Lee

(10) Patent No.: US 9,931,968 B2
(45) Date of Patent: Apr. 3, 2018

(54) MAT STRUCTURE FOR VEHICLE AND SEWING DEVICE THEREFOR

(71) Applicant: GLOBAL THE ONE KOREA CO., LTD., Gyeonggi-do (KR)

(72) Inventor: Sang Yeon Lee, Gyeonggi-do (KR)

(73) Assignee: GLOBAL THE ONE KOREA CO., LTD., Gyeonggi-Do (KR)

( * ) Notice: Subject to any disclaimer, the term of this patent is extended or adjusted under 35 U.S.C. 154(b) by 55 days.

(21) Appl. No.: 15/022,339

(22) PCT Filed: Sep. 22, 2014

(86) PCT No.: PCT/KR2014/008775
§ 371 (c)(1),
(2) Date: Mar. 16, 2016

(87) PCT Pub. No.: WO2015/041489
PCT Pub. Date: Mar. 26, 2015

(65) Prior Publication Data
US 2016/0229324 A1 Aug. 11, 2016

(30) Foreign Application Priority Data
Sep. 23, 2013 (KR) .......................... 10-2013-0112694

(51) Int. Cl.
*D05B 35/02* (2006.01)
*B60N 3/04* (2006.01)
*D05B 35/06* (2006.01)

(52) U.S. Cl.
CPC ............. *B60N 3/046* (2013.01); *B60N 3/044* (2013.01); *B60N 3/048* (2013.01); *D05B 35/02* (2013.01); *D05B 35/06* (2013.01)

(58) Field of Classification Search
CPC ......... D05B 35/02; D05B 35/06; D05B 33/00
See application file for complete search history.

(56) References Cited

FOREIGN PATENT DOCUMENTS

| KR | 10-2008-0006317 A | 1/2008 |
| KR | 20-2013-0003869 U | 6/2013 |
| KR | 20-0468425 Y1 | 8/2013 |
| KR | 10-1350216 B1 | 1/2014 |

OTHER PUBLICATIONS

International Search Report for PCT/KR2014/008775.

*Primary Examiner* — Alexander Thomas
(74) *Attorney, Agent, or Firm* — The PL Law Group, PLLC

(57) ABSTRACT

A mat structure for a vehicle, in which an edging member capable of preventing impurities such as soil from falling down to an indoor floor of the vehicle is sewed on an upper surface of an edge of a mat, and a sewing device capable of easily sewing the edging member and a magic tape on the mat. The mat prevents impurities remaining on the upper mat from falling down to the indoor floor of the vehicle and contaminating inside the vehicle by using the protrusion portion, and passengers may scrape the impurities off bottoms of the passenger's shoes on the protrusion portion so that the impurities remain on the upper mat. Also, the protrusion portion protects a sewing line of the female magic tape against frictions with the bottoms of the shoes, and prevents the sewing line from being torn off.

1 Claim, 9 Drawing Sheets

MAT STRUCTURE FOR VEHICLE AND SEWING DEVICE THEREFOR

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/008775, filed Sep. 22, 2014, which claims priority to the benefit of Korean Patent Application No. 10-2013-0112694 filed in the Korean Intellectual Property Office on Sep. 23, 2013, the entire contents of which are incorporated herein by reference.

TECHNICAL FIELD

The inventive concept relates to a mat structure for a vehicle and a sewing device therefor, and more particularly, to a mat structure for a vehicle having an edging member that is sewn along an upper surface of an edge of a mat so as to prevent impurities such as dust from falling down to an internal floor of a vehicle, and a sewing device capable of easily sewing the edging member and a magic tape to the mat.

BACKGROUND ART

The inventive concept relates to an improvement regarding Utility Model Registration No. 20-0468425 that was filed by the present Applicant on Oct. 21, 2009 and registered on Aug. 6, 2013.

A car mat disclosed in Utility Model Registration No. 20-0468425 includes, as shown in FIG. 1, an upper mat 110 including a plurality of holes 112 through which impurities such as dust are introduced, and a lower mat 120 having a corresponding size to that of the upper mat 110 and including a plurality of concave recesses 122 for accommodating the impurities introduced through the holes 112.

Magic tapes 111 and 121 that are detachably attached to each other are sewed on edges of the upper mat 110 and the lower mat 120.

According to the car mat having the above structure, impurities such as dust, soil, etc. fallen from passengers during driving a vehicle are accommodated in the concave recesses 122 of the lower mat 120 through the holes 112, and accordingly, an indoor space of a vehicle may be pleasantly maintained and peripheral contamination may be reduced.

In the above car mat, the magic tape (Velcro) 111 sewed on the edge of the upper mat 110 slightly protrudes more than an upper surface of the upper mat 10, and thus, falling down of the impurities remaining on the upper mat 110 onto an indoor floor of the vehicle may be prevented. However, if the car mat is used for a long period of time, a sewing line of the magic tape 111 may be damaged due to friction contact with impurities or passenger's shoes, and accordingly, the magic tape 111 may be torn off the upper mat 110.

SUMMARY

The inventive concept provides a mat structure for a vehicle capable of preventing impurities dropped onto a car mat from falling down to an indoor floor of the vehicle and preventing a sewing line of magic tapes from tearing off due to contacts to passenger's shoes.

The inventive concept provides a sewing device for a car mat, capable of easily sewing the car mat, magic tapes, and edging members.

According to an aspect of the inventive concept, there is provided a mat structure for a vehicle, the mat structure including: an upper mat including a plurality of holes through which impurities such as soil and dust are introduced; a lower mat for accommodating the impurities introduced through the plurality of holes; a female magic tape sewed on an edge of the upper mat; and a male magic tape sewed on an edge of the lower mat to be attached to the female magic tape, in which an edging member is provided to be interposed and sewed between the female magic tape and the upper mat, the edging member includes: a core member including a flexible material; and a fabric member folded in half to surround the core member to prevent movement of the core member by using a sewing line formed by a sewing operation, and including a protrusion portion surrounding the core member and a plane portion that are divided based on the sewing line, the plane portion is interposed and sewed between an upper surface of the upper mat and a lower surface of the female magic tape and the protrusion portion is exposed out of the female magic tape, and the protrusion portion has a thickness that is relatively greater than a thickness of the female magic tape.

The plane portion that is folded may include a first part and a second part, and the first part is interposed and sewed between the upper surface of the upper mat and the lower surface of the female magic tape, and the second part is flipped opposite to the first part so as to cover the upper surface of the upper mat.

The fabric member may have an end portion having an empty space to a length L without the core member and the other end portion, from which the core member protrudes to the length L, so that the core member protruding from the fabric member may be coupled to the empty space at the end portion of the fabric member.

According to an aspect of the inventive concept, there is provided a sewing device for a mat structure for a vehicle, the sewing device interposing and sewing the edging member between an upper surface of an upper mat and a lower surface of a female magic tape, and the sewing device including: a base plate having a needle hole that an end portion of a needle for sewing a sewing thread enters; a first guide fixed on the base plate, and including a guide tunnel, to which the upper surface, a side surface, and a lower surface of an edge of the upper mat are guided, for rolling and guiding the female magic tape to cover the upper surface, the side surface, and the lower surface of the edge of the upper mat; and a second guide fixed on the base plate adjacent to the first guide, and including a first guide path through which a protrusion portion is guided, and a second guide path for guiding a plane portion toward a space between the upper surface of the upper mat and the lower surface of the female magic tape.

First, a protrusion portion 221 prevents impurities remaining on an upper surface of the upper mat 110 from falling down to an indoor floor of a vehicle and contaminating the floor.

Also, passengers may scrape impurities off bottoms of passenger's shoes on the protrusion portion 221 so that the impurities remain on the upper mat 110, and the protrusion portion 221 may protect a sewing line 111a of the female magic tape 111 against friction with the bottoms of the shoes so as to prevent the sewing line from being torn off.

In addition, a plane portion 222 of an edging member 200 is configured to include a first part 222a and a second part 222b. In addition, the first part 222a is interposed and sewed between an upper surface of the upper mat 110 and a lower surface of the female magic tape 111, and the second part 222b is flipped opposite to the first part 222a to cover the upper surface of the upper mat 110. As such, impurities remaining on the upper mat 110 may stay on the upper mat 110 due to the second part 222b or may fall down onto the lower mat 120 via holes 112. In addition, forming of a gap between the upper mat 110 and the edging member 200 is prevented so as not to cause inconvenience of cleaning due to infiltration of the impurities.

Third, since opposite end portions of the edging member 200 are connected to each other via a core member 210, and thus, an additional finishing member is not necessary.

Fourth, according to the sewing device, the female magic tape 111 enters a guide tunnel 311 of a first guide 310 while surrounding the edge of the upper mat 110, and in a state where the edging member 200 is coupled to a second guide 320, a sewing operation is performed by reciprocating a needle 330 while pushing the upper mat 110. As such, the sewing may be easily executed while the plane portion 222 of the edging portion 200 enters a space between the lower surface of the female magic tape 111 and the upper surface of the upper mat 110.

DETAILED DESCRIPTION

A mat structure for a vehicle according to an embodiment of the inventive concept may prevent impurities such as soil from falling down to an indoor floor of the vehicle, and a sewing device is capable of easily sewing an edging member between an upper mat and a female magic tape.

Figure 1:
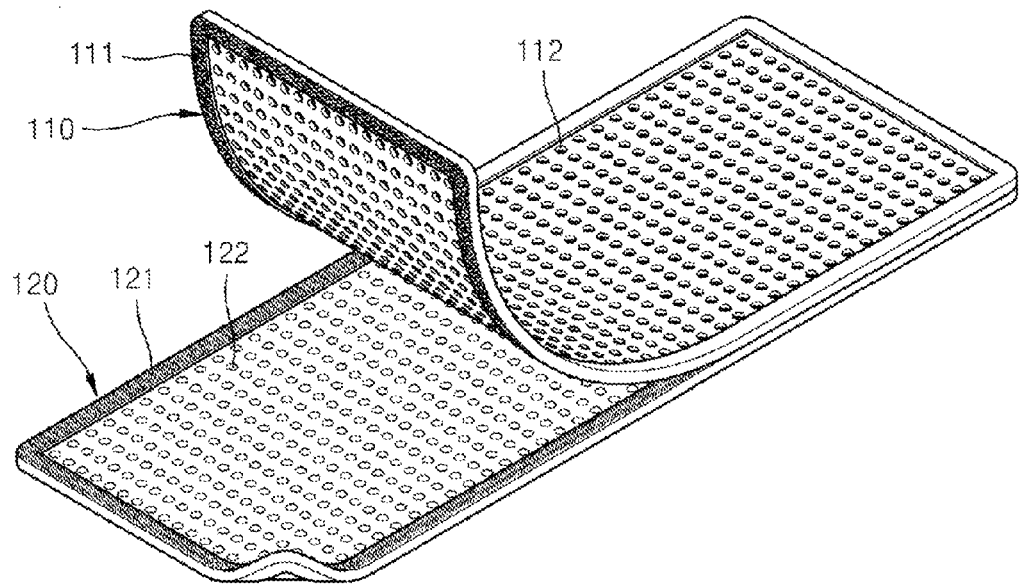
FIG. 1 is a perspective view of a car mat according to the prior art.
Figure 2:
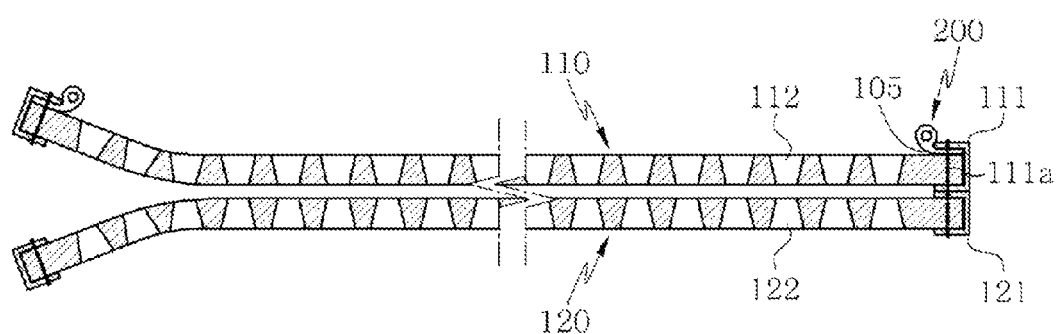
FIG. 2 is a cross-sectional view of a mat structure for a vehicle according to an embodiment of the inventive concept.

Referring to FIG. 2 that is a cross-sectional view of a mat structure for a vehicle according to an embodiment of the inventive concept, the mat structure includes an upper mat 110 having a plurality of holes 112 through which impurities such as soil and dust are introduced, a lower mat 120 having concave recesses 122 for accommodating the impurities introduced through the holes 112, a female magic tape 111 sewed on an edge of the upper mat 110, and a male magic tape 121 sewed on an edge of the lower mat 120 and attached to the female magic table 111.

As a featured structure of the inventive concept, the female magic tape 111 and the upper mat 110 are sewed with an edging member 200 disposed between the female magic tape 111 and the upper mat 110.

Figure 3:
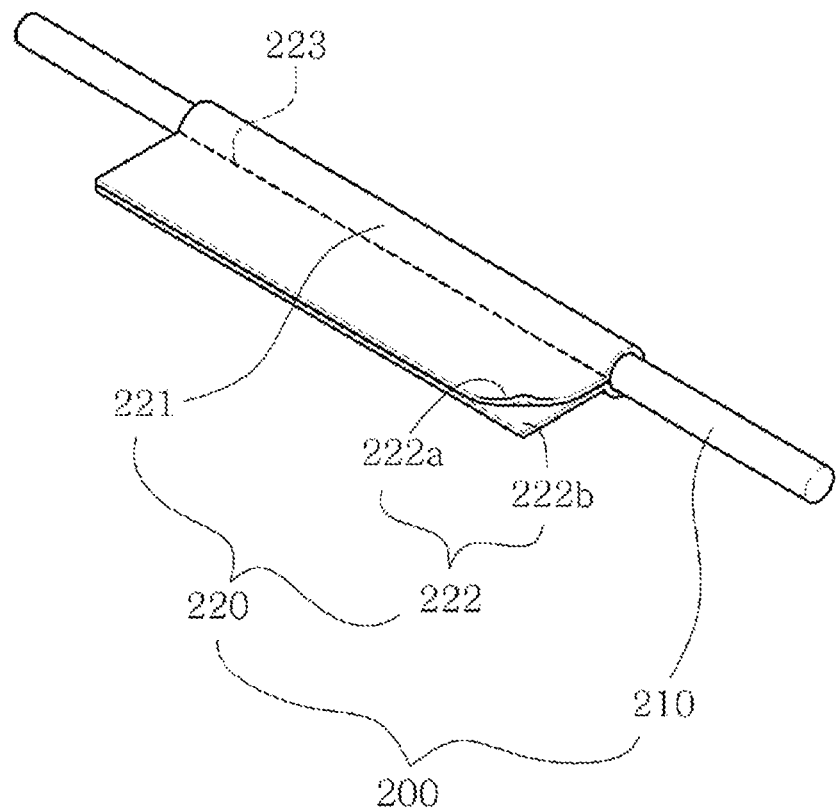
FIG. 3 is a perspective view of an edging member.

Referring to FIGS. 2 and 3, the edging member 200 includes a core member 210 including a flexible material, and a fabric member 220 folded in half so as to surround the core member 210, preventing movement of the core member 210 by using a sewing line 223 obtained through a sewing operation, and including a protrusion portion 221 surrounding the core member 210 and a plane portion 222 that are partitioned based on the sewing line 223.

The plane portion 222 is sewed as being interposed between an upper surface of the upper mat 110 and a lower surface of the female magic tape 111, and the protrusion portion 221 is exposed out of the female magic tape 111. In addition, the protrusion portion 221 has a thickness that is relatively greater than that of the female magic tape 111.

In the mat structure having the above configuration, the protrusion portion 221 prevents the impurities remaining on the upper surface of the upper mat 110 from falling down to an indoor floor of the vehicle and contaminating the floor of the vehicle.

In addition, passengers may scrape impurities off bottoms of the shoes on the protrusion portion 221 so that the impurities may remain on the upper mat 110, and the protrusion portion 221 may protect a sewing line 111a of the female magic tape 111 against the friction with the bottoms of shoes and prevent the sewing line from being torn off.

Figure 4:
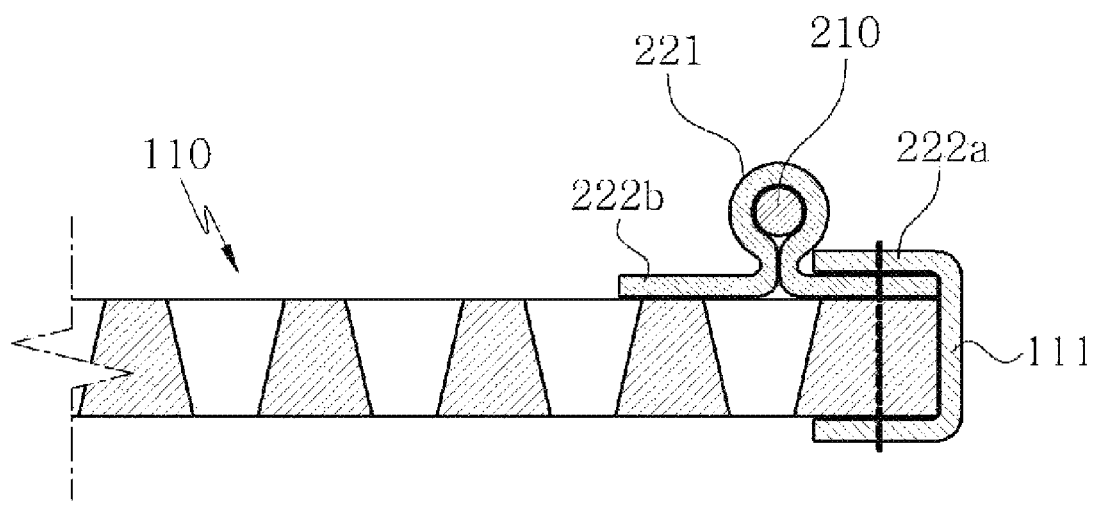
FIG. 4 is a cross-sectional view showing main elements in a mat structure according to another embodiment of the inventive concept.

Meanwhile, referring to FIGS. 3 and 4, according to another embodiment of the inventive concept, the folded plane portion 222 includes a first part 222a and a second part 222b, wherein the first part 222a is interposed and sewed between the upper surface of the upper mat 110 and the lower surface of the female magic tape 111, and the second part 222b is flipped to opposite side of the first part 222a so as to cover the upper surface of the upper mat 110.

In a case of the embodiment illustrated with reference to FIG. 2, the impurities such as soil remaining on the upper mat 110 are caught by a gap 105 between the edging member 200 and the upper mat 110, and are difficult to be cleaned. However, according to the embodiment illustrated with reference to FIG. 4, the impurities such as soil remaining on the upper mat 110 stay on the upper mat 110 due to the second part 222b or fall down to the lower mat 120 via the holes 112.

Figure 6:
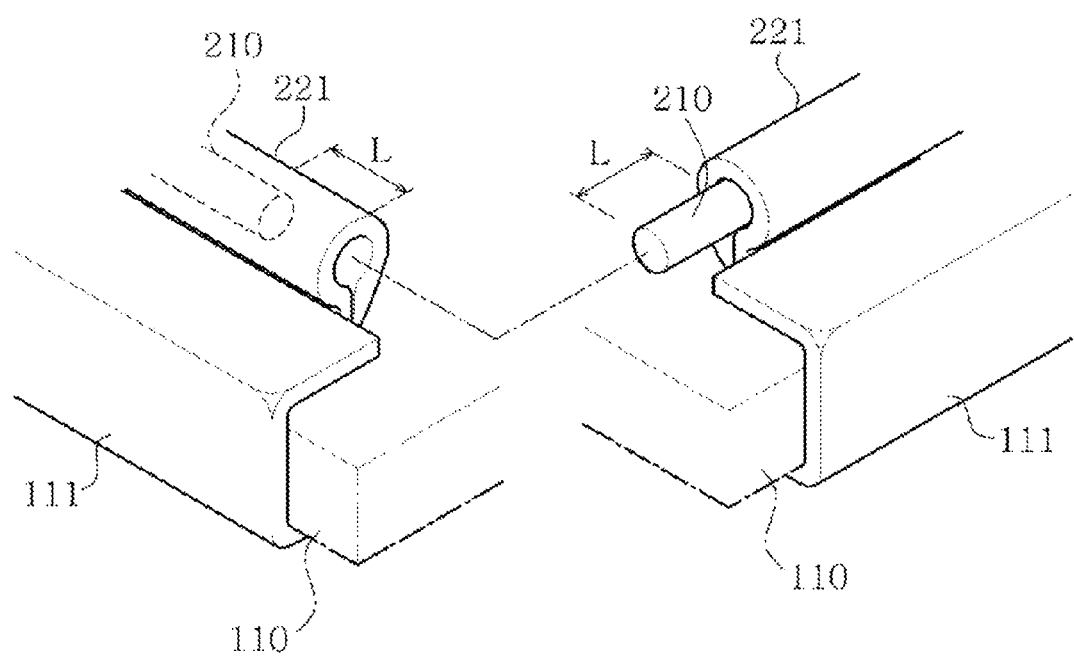
FIG. 6 is a schematic perspective view of another embodiment of the inventive concept.
Figure 7:
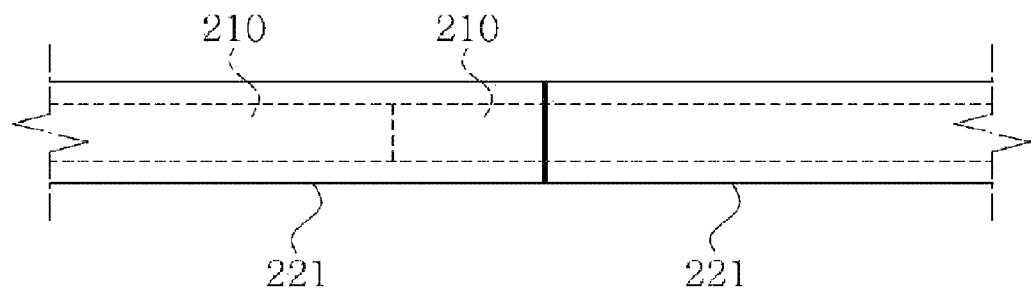
FIG. 7 is a schematic diagram showing a connecting state of FIG. 6.

FIGS. 6 and 7 illustrate another embodiment of the inventive concept. The fabric member 220 has an end portion having an empty space of a length L without the core member 210, and the other end portion from which the core member 210 protrudes to the length L. Thus, the core member 210 protruding from the end portion of the fabric member 220 may be inserted into the empty space in the other end portion of the fabric member 220.

Figure 5:
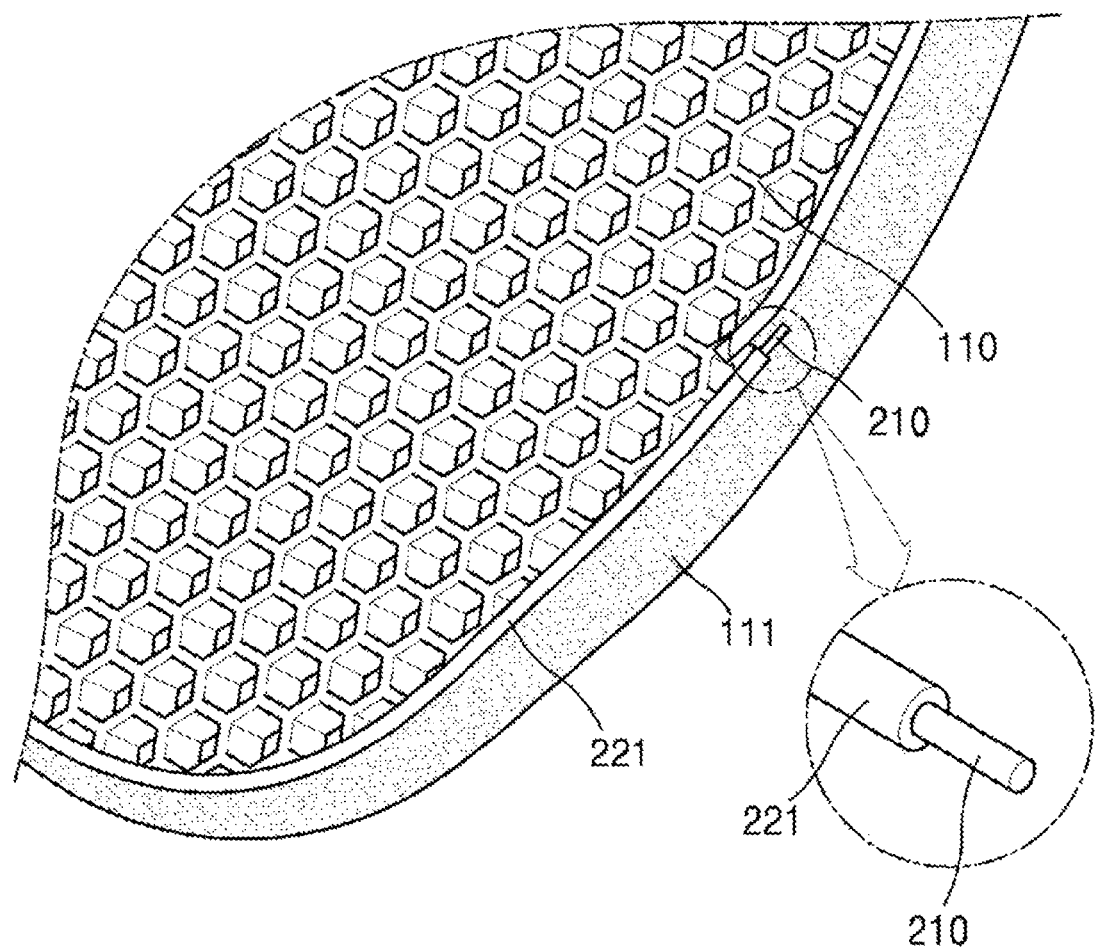
FIG. 5 is a schematic diagram illustrating a connecting state at opposite end portions of an edging member.

The above embodiment is for wrapping opposite end portions of the edging member 200 up after sewing the edging member 200 on the upper mat 110 as shown in a drawing of FIG. 5. According to the embodiment, the opposite end portions of the edging member 200 are connected to each other via the core member 210, and thus, an additional finishing member is not necessary.

FIGS. 8 to 13 are diagrams of a sewing device according to an embodiment and execution drawings of the sewing device.

The sewing device may easily perform the sewing operation by interposing the edging member 200 between the upper surface of the upper mat 110 and the lower surface of the female magic tape 111.

The sewing device includes: a base plate 300 having a needle hole 301 that an end portion of a needle 330 for sewing a sewing thread enters; a first guide 310 fixed on the base plate 300, and including a guide tunnel 311, to which an upper surface, a side surface, and a lower surface of the edge of the upper mat 110 are guided, for guiding the female magic tape 111 to be rolled so as to cover the upper surface, the side surface, and the lower surface of the edge of the upper mat 110; and a second guide 320 fixed on the base plate 300 adjacent to the first guide 310, and including a first guide path 321 through which the protrusion portion 221 is guided, and a second guide path 322 for guiding the plane portion 222 toward a space between the upper surface of the upper mat 110 and the lower surface of the female magic tape 111.

Figure 8:
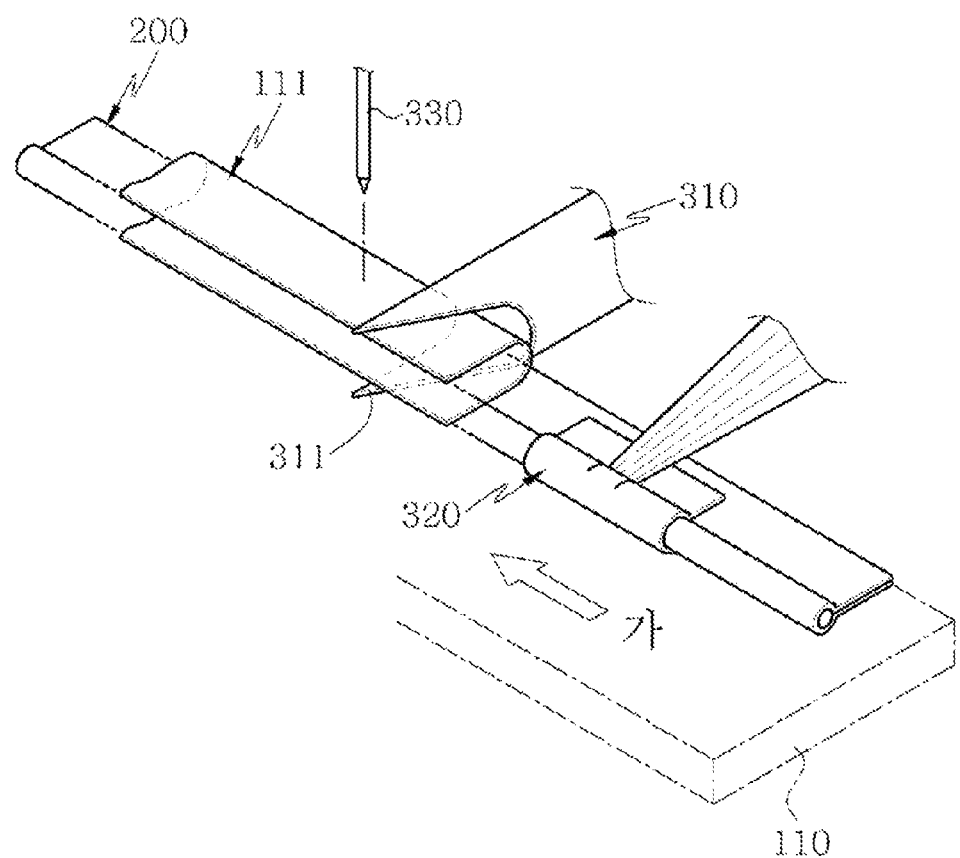
FIG. 8 is a schematic diagram of a sewing device according to an embodiment of the inventive concept.
Figure 9:
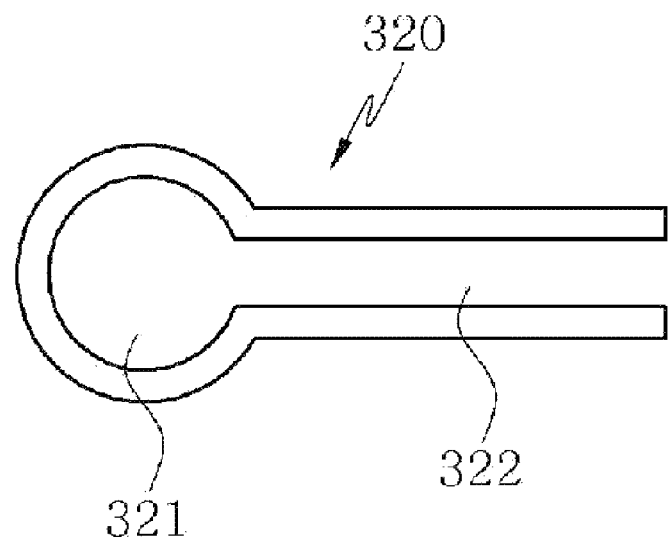
FIG. 9 is a cross-sectional view of a second guide adopted in the sewing device according to an embodiment.
Figure 10:
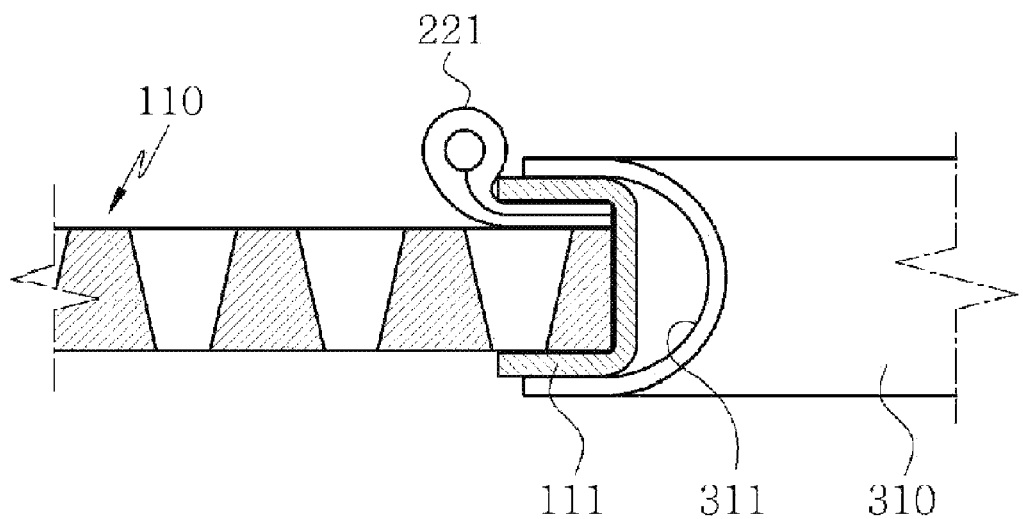
FIG. 10 is a diagram illustrating operations of the sewing device according to an embodiment.
Figure 11:
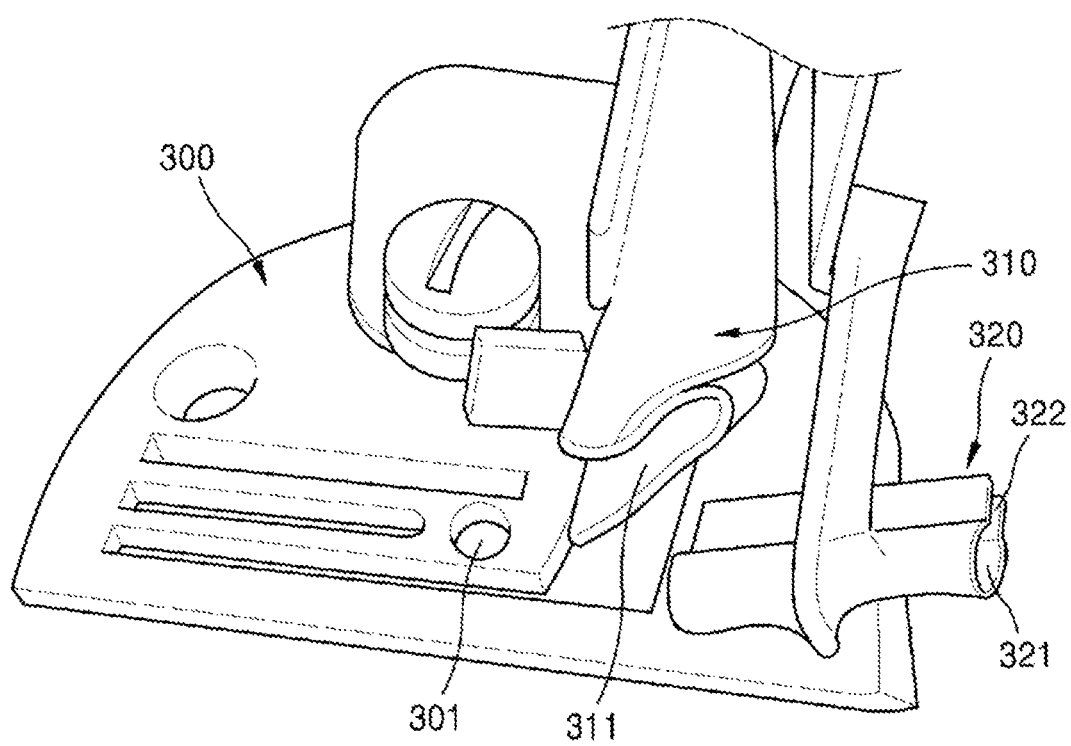
FIG. 11 is a schematic diagram showing main elements of the sewing device according to an embodiment.
Figure 12:
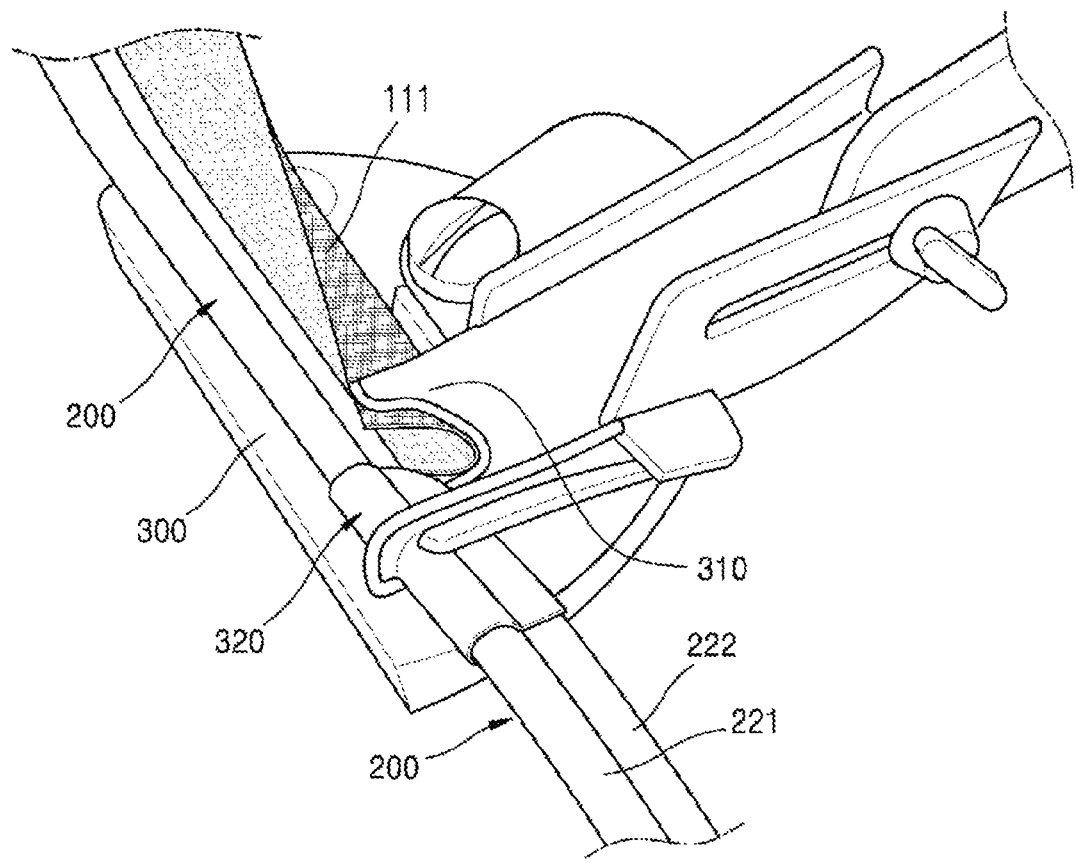
FIGS. 12 and 13 are schematic diagram of sewed states performed by the sewing device according to an embodiment.
Figure 13:
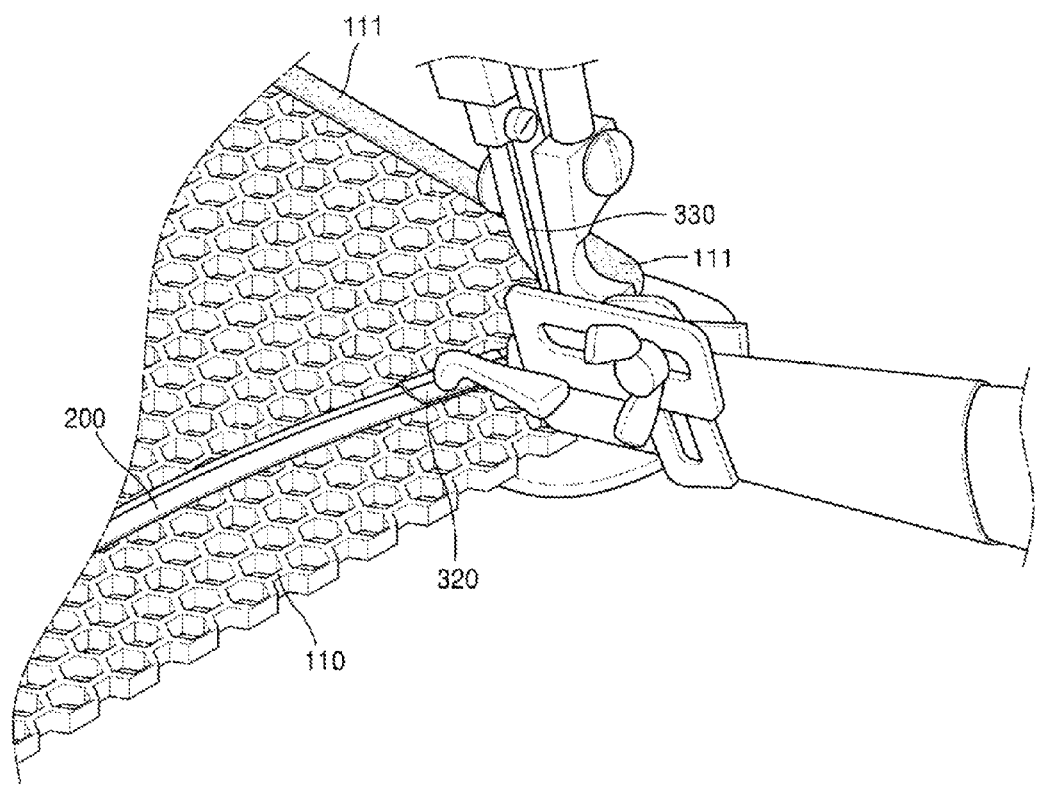

As shown in FIGS. 8 and 12, the sewing device makes the female magic tape 111 enter the guide tunnel 311 of the first guide 310 in a state where the female magic tape 111 surrounds the edge of the upper mat 111, and performs the sewing operation by reciprocating the needle 330 while pushing the upper mat 110 in a direction denoted as "A" in a state where the edging member 200 is coupled to the second guide 320. As such, the edging member 200, the female magic tape 111, and the upper mat 110 may be easily sewed together while the plane portion 222 of the edging member 200 enters between the lower surface of the female magic tape 111 and the upper surface of the upper mat 110.

The invention claimed is:

1. A sewing device for a mat structure of a vehicle, the sewing device for interposing and sewing an edging member between an upper surface of an upper mat and a lower surface of a female magic tape, the sewing device comprising:
   a base plate having a needle hole that an end portion of a needle for sewing a sewing thread enters;
   a first guide fixed on the base plate, and comprising a guide tunnel, to which the upper surface, a side surface, and a lower surface of an edge of the upper mat are guided, for rolling and guiding the female magic tape to cover the upper surface, the side surface, and the lower surface of the edge of the upper mat; and
   a second guide fixed on the base plate adjacent to the first guide, and comprising a first guide path through which a protrusion portion is guided, and a second guide path for guiding a plane portion toward a space between the upper surface of the upper mat and the lower surface of the female magic tape.

* * * * *